Patented Sept. 25, 1951

2,569,095

UNITED STATES PATENT OFFICE 2,569,095

METHOD OF PRODUCING CARBON, SULFUR, AND HYDROGEN COMPOSITIONS

Bernard W. Gamson, Morton Grove, Ill., assignor to Great Lakes Carbon Corporation, Morton Grove, Ill., a corporation of Delaware No Drawing. Application June 15, 1948,
Serial No. 33,227

12 Claims. (Cl. 260—139)

This invention relates to a method for the production of sulfo-carbons and sulfo-hydrocarbons by the reaction of elemental sulfur with heavy hydrocarbonaceous materials under controlled conditions.

The sulfo-hydrocarbons are hard, amorphous, black, infusible, insoluble, solid substances comprising sulfur hydrogen and carbon in chemical combination. They may contain minor amounts, generally less than 2%, of combined oxygen and nitrogen. The sulfo-hydrocarbons contain from about 47 to about 70% by weight of carbon, about 1.8 to about 4% of hydrogen, about 25–50% of sulfur and up to about 2.5% of oxygen, nitrogen and other constituents including ash. They have a real density of about 1.3 to about 1.7.

The sulfo-hydrocarbons are made by forming a uniform liquid mixture of elemental sulfur with heavy hydrocarbons at a temperature of about from 300–450° F. and then heating the liquid material to a temperature of about from 450° F. to about 575–625° F., converting it into a solid, infusible reaction product. The sulfo-hydrocarbons are useful as fillers, reinforcing agents and as a base material for the formation of other products such as carbon disulfide, activated carbon and the like.

The sulfo-carbons are amorphous, hard, black, infusible, insoluble solids comprising sulfur, carbon and hydrogen in chemical combination and having a density of about 1.5 to about 1.9. The carbon content ranges from about 70 to about 93%, hydrogen from about 1.8 to about 0.3%, sulfur from about 6 to about 25%, and oxygen, nitrogen, and ash from about 0.1 to 2.5%. The sulfo-carbons are made by calcining the sulfo-hydrocarbons at a temperature of about 1100 to about 1800° F. and preferably from about 1200–1600° F. They are useful as a raw material for the manufacture of carbon disulfide in which process they may be heated with vapors of elemental sulfur at a temperature of 1100–1800° F. They are among the most reactive materials known for this purpose and the carbon content thereof can be converted to carbon disulfide to the extent of 95–100% depending upon the method and conditions under which they are formed.

In one specific embodiment this invention comprises a process for manufacturing sulfo-hydrocarbons and sulfo-carbons by dissolving raw, normally infusible coke made by pyrolizing hydrocarbon mixtures, said coke having a volatile content of at least 8% and preferably about 10–30%, which volatile content is capable of evolution only upon carbonization of the coke, in a suitable solvent to form a solution which is liquid in the range of 300–500° F., thereafter forming a uniform liquid mixture of said coke solution which elemental sulfur in proportions at least 60% of the stoichiometric equivalent of the hydrogen content of the organic components of said solution at a temperature of about 300–450° F., then heating the mixture at about 450–625° F., converting it to a solid, infusible, insoluble substance, and heating the solid thus formed at 625–1800° F. to form a hard, dense, amorphous, insoluble, infusible composition consisting essentially of combined carbon, hydrogen and sulfur.

The raw coke employed in this process is a normally infusible product resulting from the pyrolysis of liquid or liquefiable hydrocarbonaceous materials, for example in the well known coking or pyrolytic cracking process. Suitable sources for the coke include petroleum crude oils, topped crude oils, reduced oils, cracked residues, shale oils, petroleum pitches, cracked and natural asphalts and other petroleum products. Likewise suitable are raw cokes made from coal tar pitch, coal tar pitch distillates, coal tar resins, wood tar pitch, wood tar oil and other liquid or liquefiable hydrocarbons.

The raw coke is prepared by the relatively low temperature pyrolysis of these charging stocks either in special coking chambers or other suitable coking apparatus or in the so-called reaction chambers of a pyrolytic cracking process wherein the coke accumulates due to the polymerization and gradual solidification of the heavy ends of the charging stock. It is essential for the carrying out of this process that the coking operation be conducted under such conditions of temperature and pressure that the resulting coke has a volatile content of at least 8% and preferably in the range of about 10–30%. The volatile content referred to herein is that portion of the coke which can be released only upon destructive distillation or carbonization of the raw coke. It does not refer to the occluded, entrapped or otherwise mechanically held liquid oil with which these cokes are sometimes saturated. Coke having the volatile content described is normally infusible which distinguishes it from heavy asphalts that can be liquified by the application of heat but which may be essentially solid at ordinary temperature conditions. The raw coke with which this invention is concerned has heretofore been considered to be essentially carbon. Since it cannot be melted merely by the application of heat, its utility has been generally limited to use as a domestic fuel, or, after calcination to reduce the volatile content, as a component in carbon electrodes and other shaped carbon bodies.

The present invention permits the conversion of the solid raw coke to products useful in the production of carbon disulfide and the like. Raw petroleum coke per se cannot be used economically in the manufacture of carbon disulfide because a large proportion of it, generally more than 80%, remains unconverted when subjected to the action of elemental sulfur vapors at the temperatures employed in the carbon disulfide process, namely 1400-1800° F. According to the process of the present invention, the carbon of the coke can be converted substantially completely to carbon disulfide.

The solvents for the coke may vary considerably, but in general comprise heavy hydrocarbons which are liquid in the range of about 300-500° F. These may be liquid at normal temperatures, say in the neighborhood of 60-100° F. and have boiling points above 350° F., or they may be solid at the ordinary temperatures having melting points below about 400° F. These include crude petroleum oils, topped crude oils, heavy shale oils, straight run and cracked distillation residues, coal tar distillates and pitches, wood tar distillates and pitches, lignite tar distillates and pitches, straight run and natural asphalts, high boiling paraffin oils, high boiling naphthenic oils, high boiling aromatic oils and residues, and the like.

Other types of solvents for the raw coke may include anthracene oil, phenanthrene, diphenyl, substituted aromatic compounds generally having condensed ring structures which have ring substituents which may be chloro, hydroxy, methoxy, amino or nitro groups. Specific examples include nitrobenzene, m-dinitrobenzene, o-nitrophenol, o-nitroanisole, o-nitroaniline, nitrochlorobenzene, dinitrochlorobenzene, mono- and dinitrotoluene, mono-and di-nitroxylenes, o-nitrodiphenyl, α-nitronaphthalene and the like. These may be used either as the sole solvent or in conjunction with any of the above described hydrocarbonaceous solvents.

The raw coke may be dissolved at about 70° to about 700° F. depending upon the solvent and the volatile content of the raw coke.

In general the hydrocarbon solvents employed should have a hydrogen content of not less than about 4% and preferably about 4-12%. The use of high molecular weight hydrocarbons containing 14% of hydrogen is also feasible although in general the coke tends to be less soluble in the hydrocarbons of predominately paraffinic structure. Larger percentages of raw coke can be dissolved in hydrocarbon solvents of from about 6-10% hydrogen content than in those containing larger proportions of hydrogen.

Depending upon the volatile content of the raw coke and upon the hydrogen content and other solubility characteristics of the solvent, from about 50 to about 90% or more of raw coke can be dissolved to produce a solution of hydrocarbons which is liquid in the range of about 300-500° F. The addition of minor percentages of solvents containing substituent groups such as those above described, appears to increase the solubility of the raw coke in the hydrocarbons and it is often desirable to add from about 1 to about 10% of this type of solvent along with the others.

It is an advantage of the present process that the relatively less expensive raw petroleum coke can be employed as a major constituent of the sulfo-carbon. In many localities petroleum coke has little or no utility other than as a fuel. The present invention makes it possible to transport this raw coke by-product in ordinary coal cars, or the holds of ships, to a point at which it can be converted into the more valuable sulfo-carbons. At the same time its use materially reduces the cost of producing sulfocarbons over what can be done with the more expensive fuel oils and other liquid or solid products which are in greater demand, and command a higher price, particularly in industrial communities.

The proportion of sulfur to be mixed with the raw coke solution varies substantially but must be at least 60% of the stoichiometric equivalent of the hydrogen content of the organic constituents of the solution. Proportions of from about 80 to 160% and preferably about 90-110% of the stoichiometric equivalent of the hydrogen content produces the best results in that the yield of available carbon in the solution converted to the solid sulfocarbons is greatly increased. At least 85% of the available carbon in the solution can be fixed in the sulfocarbon composition by using the above mentioned proportions of elemental sulfur. Depending upon the amount of raw coke that may be contained in the solution, this percentage may range up to in excess of 99% carbon fixation.

The initial heating step is carried out for such a time as is required to form a substantially uniform, generally single phase, mixture after which the liquid may be heated under varying conditions to produce the solid product. One method of doing this is described in my copending application, Serial Number 649,731, now Patent No. 2,447,005, issued August 17, 1948. Other methods of producing discrete particles of varying size may be employed. For example the hot liquid may be sprayed into a chamber or reaction zone in the form of fine droplets wherein they are converted to solid particles which may or may not be subsequently calcined. The liquid droplets may be sprayed into a rising stream of heated inert gas such as nitrogen, hydrogen disulfide and the like in a zone maintained at a temperature of from 625 to 1800° F. and may thereby be converted in a single stage to the desired sulfohydrocarbon or sulfo-carbon depending upon the temperature conditions employed.

As previously stated, the sulfo-carbons are produced by heating the sulfohydrocarbon at about 1100-1800° F. During this heating step hydrogen sulfide is evolved in copious quantities and the carbon content of the liquid containing the added sulfur is fixed.

The hydrogen sulfide may be separated and oxidized by known processes to elemental sulfur which may then be returned to the process for reuse. This may be done by burning the hydrogen sulfide in air or oxygen with or without a catalyst being employed. A certain relatively small percentage of low molecular weight organic gases may be formed in the process and these may be burned along with it. The sulfur is usually recovered by cooling sufficiently to liquify it in the temperature range of about 120-155° C.

The calcination should be carried out in an inert atmosphere and this atmosphere may include hydrogen sulfide, carbon disulfide and the like. Steam, carbon dioxide and oxygen should be avoided since it tends to consume carbon and sulfur and to reduce the density of the sulfohydrocarbon and sulfo-carbon products.

*Example I*

A raw petroleum coke made by non-catalytically cracking a topped Mid-Continent crude oil and containing 23.4% volatile matter capable of release only upon carbonization was mixed with varying percentages of a heavy coal tar distillate. The proportions dissolved were 21, 50, and 71% coke by weight. The mixture was heated at about 650° F. using stirring until a uniform liquid was produced. With the higher percentage of dissolved coke, minute particles of solid material were contained in suspension and did not settle out upon standing. Small fractions of these solutions when cooled at room temperature of about 75° F. were found to be uniform, glossy pitches. With the lowest percentage of coke, the pitch was soft. The 50-50 mixture produced a ductile, glossy, uniform pitch of medium hardness. With the high percentage of raw coke, the material was very hard and brittle. These mixtures contained between 5-7% of hydrogen.

Elemental sulfur was added at 350° C. in proportion equivalent to 100% of the stoichiometric hydrogen content. As soon as the mixture became uniform it was heated to 575° F. where it became solid, infusible and insoluble during which time hydrogen sulfide was evolved. The solid, infusible sulfo-hydrocarbon thus produced was then heated to 1400° F. during which time hydrogen sulfide was evolved. At the end of this treatment the solid sulfo-carbon was found to be insoluble, infusible, amorphous and to have a density of about 1.7. The carbon content was 87%, sulfur content 12.0% and hydrogen content 0.8% with a trace of oxygen and nitrogen.

The sulfo-carbon thus produced was placed in a heated reaction tube and sulfur vapors passed over it at various temperatures ranging from 1100 to 1500° F. At 1100° F. the reaction rate was appreciable but slow, although substantial quantities of carbon disulfide were produced. At 1400° F. and higher the conversion to carbon disulfide was rapid and more than 99% of the carbon was converted to carbon disulfide.

*Example II*

A second series of runs to make sulfo-carbons were prepared by dissolving a raw West Texas petroleum coke of 10.1% volatile content in heavy coal tar oil. 20, 50, and 70% of coke by weight was dissolved in the oil at a temperature of about 680° F. The coke did not dissolve completely but there were minute particles which remained in suspension in the samples containing 20 and 50% of coke. At 70%, a viscous paste was formed which was not completely uniform and which did not liquify upon heating. This indicates that a substantial percentage of the coke can be dissolved but as the volatile content becomes low, the percent soluble in the solvent becomes increasingly less.

These mixtures were heat treated as described in the Example I and then converted to sulfo-carbons. Upon reaction with sulfur vapor at 1400° F., more than 95% of the carbon was converted to carbon disulfide.

When either of the raw cokes above described were subjected to the action of sulfur to make carbon disulfide, less than about 10% of the available carbon in the coke could be converted, the remainder being completely inert.

*Example III*

A formula employing the coke of Example I but using a heavy cracked petroleum residue liquid at normal temperatures, was prepared at 600° F. The major portion of the coke was in solution in the residue with highly dispersed, extremely fine particles of solid material in stable suspension. These mixtures were then treated with approximately stoichiometric proportions of elemental sulfur and thereafter converted as described in Example I to the sulfo-carbon. In excess of 95% of the available carbon in the sulfo-carbon could be converted to carbon disulfide at 1400° F.

*Example IV*

The addition of 1% of a nitronaphthalene to the mixtures of Example III increased the solubility of the raw coke in the hydrocarbon solvent. Upon conversion to the sulfo-carbon in the manner described, followed by reacting with elemental sulfur to produce carbon disulfide, 97% of the available carbon was convertible to carbon disulfide.

I claim as my invention:

1. A process for manufacturing hard, dense, insoluble, infusible, compositions of carbon, sulfur and hydrogen, which comprises dissolving raw, normally infusible coke made by pyrolyzing hydrocarbon mixtures, said coke having a volatile content of at least 8% which is capable of evolution only upon carbonization, in a solvent for said coke to form a solution which is liquid in the range of 300-500° F., thereafter forming a uniform liquid mixture of said coke solution with elemental sulfur in proportions at least 60% of the stoichiometric equivalent of the hydrogen content of the organic components of said solution, at a temperature of about 300-450° F., heating the mixture at 450-625° F. converting it to a solid material, and heating the solid at 625-1800° F. to form a hard, dense, amorphous, insoluble, infusible composition of chemically combined carbon, hydrogen and sulfur.

2. A process of claim 1 wherein said solid material is heated at about 1100-1800° F.

3. The process of claim 1 wherein the solvent is liquid within the range of 300-500° F.

4. The process of claim 1 in which the sulfur is at least 90% the stoichiometric equivalent of the hydrogen content of the solution.

5. The process of claim 1 wherein the solvent is a heavy petroleum hydrocarbon mixture liquid at 300-500° F.

6. The process of claim 1 wherein the solvent is a heavy aromatic hydrocarbon liquid at about 300-500° F.

7. The process of claim 1 wherein the solution of raw coke in the solvent for said coke is effected at a temperature below about 700° F.

8. The process of claim 1 wherein the solvent comprises a fraction of coal tar.

9. The process of claim 1 wherein the solvent comprises asphalt.

10. The process of claim 1 wherein the solvent comprises petroleum residuum.

11. The process of claim 1 wherein the solvent comprises an aromatic compound, said solvent being liquid at about 300-500° F.

12. The process of claim 1 wherein the solvent comprises a coal tar fraction liquid at about 300-500° F. and a minor proportion of an aromatic compound.

BERNARD W. GAMSON.

REFERENCES CITED

The following references are of record in the file of this patent:

UNITED STATES PATENTS

| Number | Name | Date |
|---|---|---|
| 2,447,005 | Gamson | Aug. 17, 1948 |